J. RICHMOND.
SCREW ANCHOR.
APPLICATION FILED JULY 21, 1914.
1,230,603.
Patented June 19, 1917.
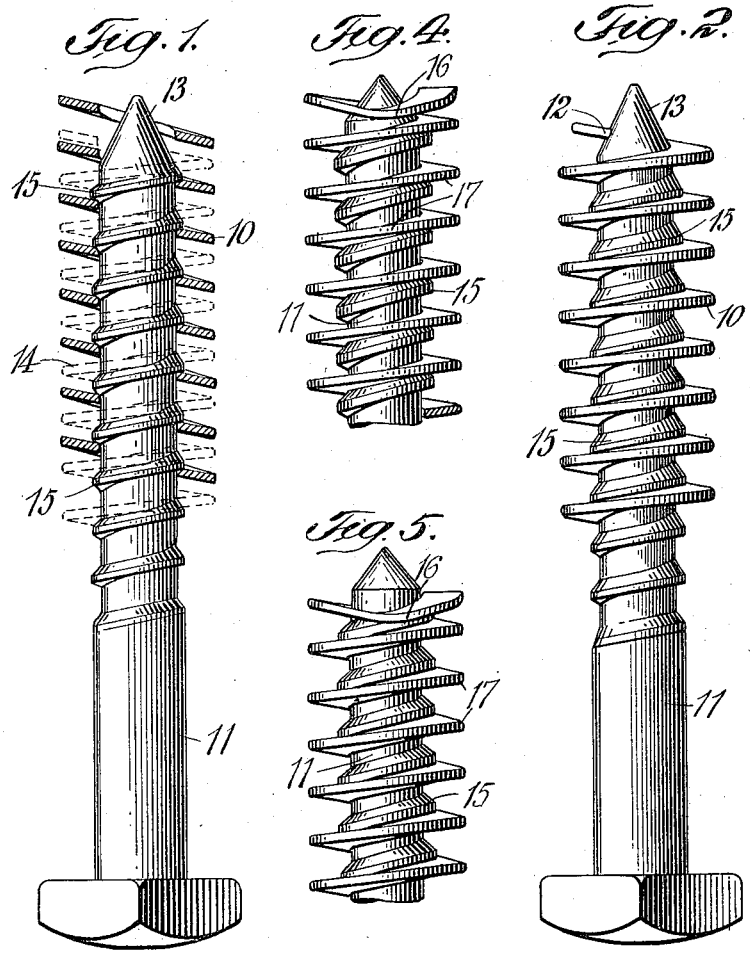

UNITED STATES PATENT OFFICE.

JULIAN RICHMOND, OF YONKERS, NEW YORK.

SCREW-ANCHOR.

1,230,603.  Specification of Letters Patent.  Patented June 19, 1917.

Application filed July 21, 1914. Serial No. 852,170.

*To all whom it may concern:*

Be it known that I, JULIAN RICHMOND, a citizen of the United States of America, and resident of Yonkers, in the county of Westchester and State of New York, have invented certain new and useful Improvements in Screw-Anchors, of which the following is a specification.

One function of the helical form of screw anchor being to provide a substantial metal bearing for the screw in whatever material the screw anchor is set and the screw is used, it is desirable that the thread of the screw shall be properly in contact with the thread of the screw-anchor throughout the length of the latter.

It is usual for the distance between the threads of the screw to be greater than the thickness of the metal in the screw anchor. Under such conditions, with the form of screw-anchor previously employed, there was no assurance, when setting the two together in any plastic substance such as concrete, that their threads were in proper relation. Later, in tightening the screw in its anchor-lined setting or in applying the load it was destined to bear, the screw was liable to crush whatever material lay between its threads and those of its anchor before being forcibly brought into contact with the latter. This false movement of the screw defeated its function as a reliable holding device and further caused the anchor-lined hole to become choked with fragments of crushed material which precluded further or repeated use of said anchor-lined hole.

For this reason it is desirable that means be provided for taking up the play between the bolt and the anchor. This is accomplished, according to the present invention, by so forming the anchor that the same coöperates with the screw, at a point in the travel of the latter, in such manner that the anchor and the thread are drawn together, and the play between them is taken up. By the new construction, in any of its forms, the anchor may be securely seated in the desired relation with the screw, before the combination of screw and screw-anchor is set in or into the plastic medium.

Furthermore, due to metallurgical limitations in drawing wire or rolling strips such as are employed in the manufacture of screw-anchors, it is impracticable to obtain any reasonable length of wire or metal strip of uniform temper or hardness. This results, during manufacture, in a more or less irregular pitch to the anchor. In consequence, whereas one portion of the thread of the anchor might be in contact with the corresponding thread of the screw, some other portion or number of turns of the thread of the anchor would not be in bearing with the screw, nullifying its very function. By the new construction anchors may be manufactured with less care regarding their pitch as even a substantial lessening or shortening of the pitch can be eliminated by stretching or springing the anchor into or onto its desired position on the screw. This is accomplished by running the anchor on the screw in the usual way until the deformed end of the anchor is arrested by the corresponding end of the screw, the body of the anchor continuing to be run on the screw thread until brought automatically to a firm bearing.

In the accompanying drawing,

Figure 1 shows in elevation a bolt, and surrounding the same, in section, a screw-anchor embodying the invention, Fig. 2 is an elevation of the bolt and anchor showing the bolt screwed in the anchor to the limit of its movement, Fig. 3 is an end-view of the anchor, and Figs. 4 and 5 show a modified construction of anchor, in two positions on the bolt.

Similar reference numerals indicate corresponding parts in all the figures.

The anchor consists, as is well known, of a helix of any suitable material, such as steel, having substantially the same pitch as the screw with which it is to be engaged. In the drawing the anchor 10 is shown as a helix of flat metal engaged with the bolt 11. The helix is contracted at its outer end, forming an inwardly-extending projection 12, which is located in the path of the bolt 11. The outer end of the bolt may be tapered, as shown at 13, or may be blunt or otherwise formed. When tapered, the projection 12 bears against the inclined surface at the end of the bolt, as shown in the figures. The helix being engaged with the thread of the bolt and having thus at its outer end the projection described in the path of the bolt, when the bolt is screwed in the helix and its outer end arrives at the projection, further outward movement of the bolt is impossible because limited by said projection.

The bolt in its inward movement having arrived at its inner end against the projection 12, and bearing thereon and continuing to be turned, and the screw-anchor remaining stationary, the bolt now forces itself outward until the helix is closely engaged at each turn with the outer face of the screw-thread 15 of the bolt. This position is shown in Fig. 2. The position of the anchor when the bolt is not so outwardly forced by engagement with the projection, but is loose within the anchor, is indicated in dotted lines 14 in Fig. 1, also in section in said figure, in the latter case the bolt being shown partially withdrawn from the anchor.

Instead of the projection 12, the helix 17 at its outer end may have its pitch reduced, as shown at 16, to such extent as to draw with the screw-thread of the bolt into contact with the helix when the outer end of the screw arrives at said reduced pitch portion of the helix. Fig. 4 shows the position of the parts when disengaged, and Fig. 5 shows the end-turn of the screw-thread engaged with the reduced pitch portion of the anchor and the screw thereby rendered incapable of play therein.

Either of the means described, by thus enabling the play to be taken up between the anchor and the bolt, secures the advantage of rendering the bolt and the anchor secure each to the other in fixed relation before the anchor is placed in position in the concrete; in other words, the bolt may be tightly screwed up in the anchor in the position shown in Figs. 2 or 5, and the two parts are thereby rendered, for purposes of manipulation in placing the same, practically one solid piece of material. This greatly facilitates the exact placing of the anchor in the particular position required by the work, there being no movement between the bolt and the anchor for which, with the previous loose anchors, allowance was necessary.

Two embodiments of the invention have been described, but it is obvious that changes may be made therein without departing from the spirit of the same as set forth in the accompanying claims.

I claim:

1. The combination with a pre-plastic hardened holding structure, of a non-cutting helical anchor and screw, the screw having a cylindrical core and provided with equally spaced convolutions of uniform diameter, the helical anchor having substantially the same pitch as the convolutions of the screw, and formed of material of substantially less thickness than the space between the convolutions of the screw, the outermost convolution of said helical anchor being directed out of the path of the remaining convolutions, the convolutions of the screw extending for a greater length than the depth of said helical anchor, the said anchor and screw adapted to be brought into pre-attachment coöperation, the said outermost convolution of the helical anchor adapted upon said pre-attachment coöperation to cause tightening of said remaining convolutions in tension against the convolutions of the screw upon continued turning of the screw upon said outermost convolution, the screw and anchor in said pre-attachment coöperation adapted to be inserted into said plastic structure, said plastic structure adapted to harden thereabout and between the convolutions of said anchor to set said anchor in said tensioned coöperative position with the screw, said anchor adapted to retain said tensioned coöperative position upon removal of said screw therefrom.

2. The combination with a pre-plastic hardened holding structure, of a non-cutting helical anchor and screw, the screw having a cylindrical core and provided with equally spaced convolutions of uniform diameter, the helical anchor having substantially the same pitch as the convolutions of the screw, and formed of material of substantially less thickness than the space between the convolutions of the screw, the outermost convolution of said helical anchor being directed out of the path of the remaining convolutions and reduced in pitch, the convolutions of the screw extending for a greater length than the depth of said helical anchor, the said anchor and screw adapted to be brought into pre-attachment coöperation, the said outermost convolution of the helical anchor adapted upon said pre-attachment coöperation to cause tightening of said remaining convolutions in tension against the convolutions of the screw upon continued turning of the screw upon said outermost convolution, the screw and anchor in said pre-attachment coöperation adapted to be inserted into said plastic structure, said plastic structure adapted to harden thereabout and between the convolutions of said anchor to set said anchor in said tensioned coöperative position with the screw, said anchor adapted to retain said tensioned coöperative position upon removal of said screw therefrom.

In testimony that I claim the foregoing as my invention I have signed my name in presence of two subscribing witnesses.

JULIAN RICHMOND.

Witnesses:
C. P. GOEPEL,
JOS. BISBAND.